3,329,706
2-HYDROXY-3-ALKENOYLOXYPROPYL-
TRIALKYLAMMONIUM HALIDES
Igor Sobolev, Orinda, Calif., assignor to Shell Oil Company, New York, N.Y., a corporation of Delaware
No Drawing. Filed Mar. 23, 1964, Ser. No. 354,163
7 Claims. (Cl. 260—486)

This invention relates to a novel method for the production of certain cationic esters, and the novel class of compounds produced thereby. More particularly it relates to a certain class of novel esters containing quaternary ammonium moieties.

Compounds incorporating quaternary nitrogen atoms and ester linkages within the molecule are known in the art, being produced, for example by acylation of ethanolamine derivatives. Such materials have established utility as surface active agents and the like, particularly when the acid moiety of the cationic ester is long chain alkyl. In part because of the method of production, it is difficult to prepare esters of this type with additional reactive functional groups, and similar esters of the prior art customarily contain only the ester linkage and the quaternary ammonium moiety as active sites. It would be of advantage to provide a class of cationic esters with additional reactive functional groups, whereby the esters could be employed to modify the properties of other materials by reaction therewith, or alternatively provide for modification of the properties of the ester such as improved solubility in certain solvents.

It is an object of the present invention to provide a novel process for the production of esters containing quaternary ammonium groups, and the novel class of products produced thereby. A further object is the provision of such cationic esters incorporating additional reactive functional groups within the molecule. A particular object is the provision of 2-hydroxy-3-alkylenoyloxypropyltrialkylammonium halides and a method for the production thereof.

It has now been found that these objects are accomplished by the process of reacting alkenoic acids with aqueous solution of glycidyltrialkylammonium halide. Surprisingly, the esterification proceeds smoothly in the absence of catalyst to produce useful cationic esters in high yield and purity with little or no formation of expected by-products, e.g., the glycol which would be expected to be formed by hydrolysis of the glycidyltrialkylammonium halide under the conditions of the reaction.

The glycidyltrialkylammonium halide employed as a reactant in the process of the invention comprises a quaternary nitrogen atom to which are attached three alkyl radicals and a glycidyl, i.e., 2,3-epoxypropyl, radical. The nitrogen, being tetravalent, is positively charged, and in the reactants of the invention is associated by means of an ionic bond with a negatively charged halide ion. Suitable glycidyltrialkylammonium halides contain halogen having an atomic number from 17 to 35, that is, the middle halogens chlorine and bromine, and alkyl groups which independently have from 1 to 12 carbons atoms. Such materials are represented by the formula

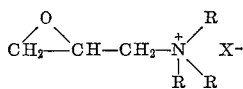

wherein X is middle halogen and R is alkyl having from 1 to 12 carbon atoms. Preferred are glycidyltrialkylammonium halides of the above-depicted formula wherein at least two, more preferably three, of the alkyls are lower alkyl, that is, contain from 1 to 4 carbon atoms. Illustrative of such compounds are glycidyltrimethylammonium chloride, glycidyltriethylammounium bromide, glycidyldimethylhexylammonium chloride, glycidyldipropyldecylammonium bromide, glycidyldimethyllaurylammonium chloride, glycidyldiethylpropylammonium chloride, glycidylmethylethylamylammonium bromide, glycidyltributylammonium chloride, and glycidyltrimethylammonium bromide. In general, quaternary ammonium chlorides are preferred over the corresponding bromides, and most preferred as the quaternary ammonium halide reactant is glycidyltrimethylammonium chloride.

The quaternary ammonium halides are conveniently prepared by reaction of the appropriate trialkylamine and α-halo epoxyalkyl compounds in aprotic reaction diluent. For example, from trimethylamine and epichlorohydrin is prepared glycidyltrimethylammonium chloride.

The glycidyltrialkylammonium halides are employed in aqueous solution. Although the presence of other miscible solvents, e.g., alcohols, particularly lower alkanols of from 1 to 4 carbon atoms, does not appear to be overly detrimental to the process of the invention, no advantage is obtained by the use thereof, and in the preferred modification of the process of the invention, only water is present as solvent. The concentration of glycidyltrialkylammonium halide in the aqueous solution is not critical, and concentrations from about 20% to about 90% by weight glycidyltrialkylammonium halide are satisfactorily utilized. Preferred, however, are concentrations from about 50% to about 80% by weight.

The alkenoic acid employed in the process of the invention is a hydrocarbon carboxylic acid possessing at least one carboxy group and at least one ethylenic linkage, i.e., non-aromatic carbon-carbon double bond, which ethylenic linkage(s) constitute the only carbon-carbon unsaturation in the molecule. Preferred acids are acyclic lower alkenoic acids which contain from 1 to 2 carboxy groups, from 1 to 2 ethylenic linkages and contain from 3 to 6 carbon atoms including the carboxy carbon atom(s). Illustrative of monocarboxylic alkenoic acids of this type are acrylic acid, methacrylic acid, crotonic acid, 3-pentenoic acid, sorbic acid, 2-methyl-2-butenoic acid, ethacrylic acid and 4-hexenoic acid; while illustrative dicarboxylic alkenoic acids include maleic acid, fumaric acid, citraconic acid, mesaconic acid, itaconic acid, 2-methyleneglutaric acid and 2-pentendioic acid. In general, monocarboxylic acids are preferred over analogous dicarboxylic acids, and further preferred are those monocarboxylic alkenoic acids wherein the ethylenic linkage is conjugated with the carboxy group and is a terminal ethylenic linkage; these are acrylic acid and the α-alkyl derivatives thereof wherein the alkyl has from 1 to 3 carbon atoms, particularly 1 carbon atom.

The process of the invention comprises mixing the aqueous glycidyltrialkylammonium halide and the alkenoic acid and maintaining the mixture at a somewhat elevated temperature until reaction is complete. The reaction is conducted at pressures which are atmospheric or superatmospheric, so long as the reaction mixture is maintained in the liquid phase. The optimum reaction temperature will in part depend upon the pressure employed, as higher reaction temperatures may be employed when the reaction pressure is greater than atmospheric. Suitable reaction temperatures are from about 45° C. to about 140° C., although when atmospheric pressure is utilized, which pressure is preferred, reaction temperatures from about 45° C. to about 105° C. are satisfactorily utilized while reaction temperatures from about about 50° C. to about 95° C. are preferred. The method of mixing is not material. One reactant may be added to the other in increments, although it is equivalently useful and frequently preferred to initially mix the entire amount of reactants. The optimum ratio of reactants to be employed will in part depend upon the functionality of the alkenoic acid reactant, that is, the number of carboxy groups within the molecule. Although ratios of moles of carboxy group to moles of glycidyltrialkylammonium halide from about 1:4 to about 4:1 are suitably employed, molar ratios from about 1:2 to about 2:1 are preferred and it is frequently advantageous to employ ratios that are substantially stoichiometric, that is, a ratio of moles of carboxy group to moles of glycidyltrialkylammonium halide that is substantially 1:1.

It is generally desirable to make some provision in the reaction procedure for the inhibition of alkenoic acid polymerization, particularly when the alkenoic acid employed is readily polymerizable, e.g., acrylic acid, methacrylic acid or the like. Surprisingly, it is not necessary to rigorously exclude oxygen from the reaction environment, and the process of the invention is conveniently conducted under an atmosphere of air. Prevention of alkenoic acid polymerization is customarily accomplished by the inclusion within the reaction mixture of an inhibitor. Conventional polymerization inhibitors capable of trapping organic free radicals formed during the reaction process are satisfactory, provided that the inhibitor is inert toward the glycidyltrialkylammonium halide reactant or products therefrom. Preferred inhibitors therefore contain no reactive hydrogen atoms. Illustrative of suitable inhibitors are the quinones, particularly mono- to dicyclic quinones, e.g., 1,4-benzoquinone, 1,2-benzoquinone and 1,4-naphthoquinone and alkylated or halogenated, particularly chlorinated, derivatives thereof such as chloranil, duroquinone, 2-ethylbenzoquinone and the like; as well as hindered phenols, i.e., phenols wherein the phenolic hydroxyl group is hindered by the presence of branched alkyl substituents on each ring position ortho relative to the hydroxyl group. Illustrative of the class of hindered phenolic inhibitors are 2,6-di-tert-butylphenol, 2,6-di-tert-butyl-4-methylphenol, 2,6-diisopropylphenol, 2,4,6-tri-tert-butylphenol and the like. The inhibitor, if employed, is added in comparably small amounts. Amounts of inhibitor from about 0.001 to about 0.1 molar percent, based upon the alkenoic acid reactant are suitable, while amounts from about 0.01% mole to about 0.05% mole on the same basis are preferred.

It is often desirable, although not required, to include within the reaction mixture a small proportion of the halohydrin corresponding to the glycidyltrialkylammonium halide. For example, the presence of a small amount of 3-chloro-2-hydroxypropyltrimethylammonium chloride to the reaction mixture is frequently advantageous when glycidyltrimethylammonium chloride is to be reacted with alkenoic acid. Although the role of the halohydrin is not completely understood, it has been observed that on occasion the presence of halohydrin accelerates the formation of the desired ester product. No large amount of halohydrin is necessary, and none is required. When halohydrin is added, however, amounts greater than about 20 molar percent, based upon the glycidyltrialkylammonium halide, appear to offer no further advantage to compensate for the added expense and in part for this reason are not to be preferred. Amounts of halohydrin from 0% mole to about 15% mole are most satisfactory.

Subsequent to the conclusion of reaction, the product solution, if desired, may be purified to remove unreacted starting material and polymerization inhibitor, as by extraction for example, or alternatively, the water is removed, by distillation for example, and the product ester is obtained as a solid which is suitable for use in many applications, or may be purified by conventional methods such as recrystallization.

The products of the invention are esters of the alkenoic acid produced by the reaction of the carboxy group(s) thereof with the epoxy, i.e., oxirane, linkage of the glycidyltrialkylammonium halide. The products are therefore mono- to di(2-hydroxy-3-dialkylaminopropyl alkohalide) esters of the alkenoic acid, which terminology is employed to indicate alkenoic acid esters wherein each alcohol moiety is represented by

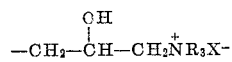

wherein R and X have the previously stated significance. The reaction is illustrated by the following equation

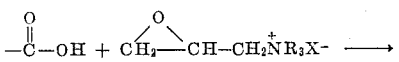

wherein R and X have the previously stated significance.

The products of the process of the invention are generically illustrated by the formula

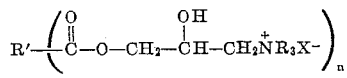

wherein R and X have the previously stated significance, R' is the residue of the alkenoic acid when the carboxy group(s) are excluded from consideration, that is, R' is a hydrocarbon alkylene moiety having from 2 to 5 carbon atoms and from 1 to 2 ethylenic linkages, and $n$ represents the number of carboxy groups present in the alkenoic acid reactant, that is, $n$ is a whole number from 1 to 2 inclusive. In the above formula, when $n$ is 2, R' of course has no more than 4 carbon atoms. Typical products produced from monocarboxylic alkenoic acids include 2-hydroxy-3-methacrylyloxypropyltrimethylammonium chloride,
2-hydroxy-3-methacrylyloxypropyltriethylammonium bromide,
2-hydroxy-3-acrylyloxypropyldimethylhexylammonium bromide,
2-hydroxy-3-crotylyloxypropyltripropylammonium chloride,
2-hydroxy-3-(3-pentenoyl)oxypropyltrimethylammonium bromide,
2-hydroxy-3-(2-hexenoyl)oxypropyltributylammonium bromide, and
2-hydroxy-3-methacrylyloxypropyltriethylammonium chloride;

while illustrative esters produced from dicarboxylic alkenoic acids include di(2-hydroxy-3-dimethylaminopropyl) maleate di(methochloride), di(2-hydroxy-3-diethylaminopropyl) itaconate di(ethobromide), di(2-hydroxy-3-laurylmethylaminopropyl) 2-methyleneglutarate di(methochloride), di(2-hydroxy-3-dimethylaminopropyl) fumarate di(methochloride) and the like.

The products of the invention are suitable for use in numerous applications. As cationic materials, they exhibit surface activity, and are further useful as biocidal chemicals, particularly germicides. The number and variety of reactive functional groups present allows wide usage as chemical intermediates, wherein, for example, the hydroxyl group may be esterified or etherified, other useful quaternary ammonium salts may be prepared as by anion exchange, or alternatively the ethylenic linkage may be epoxidized to form useful epoxy resin precursors. A particularly important utility for the products of the invention is in the formation of polymers and copolymers. Of importance in this latter regard are the polymers or copolymers of the esters of acrylic acid or the α-alkyl derivatives thereof. These esters readily homopolymerize through the ethylenic linkage or copolymerize with other reactive monomers such as acrolein, acrylonitrile, styrene, butadiene and the like to form polymeric materials of considerable importance. The copolymer of 2-hydroxy-3-methacrylyloxypropyltrimethylammonium chloride and acrolein, for example, has been found to be extremely useful as a wet-strength additive for paper.

To further illustrate the novel process of the invention and the novel products produced thereby, the following examples are provided. It should be understood that they are not to be regarded as limitations, as the teachings thereof may be varied as will be understood by one skilled in this art.

*Example I*

A mixture of 157 g. methacrylic acid, 400 g. of 69.5% by weight aqueous glycidyltrimethylammonium chloride solution and 15 g. of 2,6-di-tert-butyl-4-methylphenol was heated for 20 hours at 50° C. and then for 15 hours at 80° C. under an atmosphere of air. The water was removed by evaporation at 50–60° C. under reduced pressure. The yield of product, 2-hydroxy-3-methacrylyloxypropyltrimethylammonium chloride was 93% of theory. Upon recrystallization of the crude product from ethanol-ethyl acetate, white crystals of the product ester were obtained, M.P. 176–7° C.

Similar results are obtained when glycidyltrimethylammonium bromide is employed as the quaternary ammonium halide reactant.

*Example II*

To 363 g. of 69% by weight aqueous glycidyltrimethylammonium chloride solution (1.65 moles) was added 7.8 g. of 37% by weight hydrochloric acid (0.078 mole). The mixture was allowed to stand at room temperature for 2.5 hours at which time the acid was consumed in reaction to produce 3-chloro-2-hydroxypropyltrimethylammonium chloride. To this solution was added 135 g. (1.57 moles) of methacrylic acid and 10 g. of 2,6-di-tert-butyl-4-methylphenol inhibitor. The mixture was gently agitated under an atmosphere of air at 22–30° C. for 42 hours and at 70° C. for 16 hours. Analysis of the product mixture showed a yield of 2-hydroxy-3-methacrylyloxypropyltrimethylammonium chloride of 90% based upon the methacrylic acid charged.

A 150 g. aliquot of the product solution (containing 110 g. of the cationic ester) was treated with 1600 ml. acetone to precipitate the ester product, which was obtained in 78% yield. Recrystallization of the crude ester product from ethanol-ethyl acetate gave white crystals of 2-hydroxy - 3 - methacrylyloxypropyltrimethylammonium chloride, M.P. 176–8° C.

|  | Anal. Calc. | Found |
|---|---|---|
| C, percent wt | 50.6 | 50.2 |
| H, percent wt | 8.48 | 8.5 |
| Bromine No | 67 | 65 |
| Ionic chlorine, eq./100 g | 0.422 | 0.427 |
| Chlorohydrin, eq./100 g | 0.000 | 0.002 |

The infrared spectrum of the product (KBr pressed plate) displayed a strong absorption band at 3.10μ which is characteristic of a hydroxyl group beta to a quaternary ammonium group.

*Example III*

By a procedure similar to that of Example II, 350 g. of an aqueous solution of glycidyltrimethylammonium chloride (1.65 moles) was reacted with 113 g. of acrylic acid (1.57 moles) and 7.75 g. of 37% by weight hydrochloric acid for 24 hours at 30° C. and then for 13 hours at 70° C. in the presence of 10 g. of 2,6-di-tert-butyl-4-methylphenol. Analysis of the product solution indicated that the desired ester was present in 78% yield based on acrylic acid. The solution was acidified to pH 2 with hydrochloric acid and extracted with chloroform to remove the inhibitor and unreacted acrylic acid. The pH of the solution was raised to 6 by the addition of dilute sodium hydroxide and the monomer solution was shown to be suitable for use in free-radical polymerizations.

The cationic ester was isolated from an aliquot of this solution by precipitation with excess acetone. Recrystallization of the solid precipitate from ethanol-ethyl acetate afforded white crystals of 2-hydroxy-3-acrylyloxypropyltrimethylammonium chloride, M.P. 125–7° C.

*Example IV*

When aqueous glycidyltriethylammonium chloride is reacted with 3-butenoic acid, a good yield of 2-hydroxy-3-(3 - butenoyl)oxypropyltriethyl - ammonium chloride is obtained.

*Example V*

When itaconic acid is reacted with an aqueous solution of glycidyldimethylbutylammonium bromide, a good yield of di(2-hydroxy-3-methylbutylaminopropyl) itaconate di(methobromide) is obtained.

I claim as my invention:

1. The ester of the formula

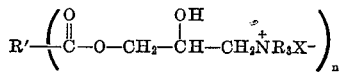

wherein each R is alkyl having from 1 to 4 carbon atoms, R' is alkylene having from 2 to 5 carbon atoms and from 1 to 2 ethylenic linkages, X is halogen having an atomic number from 17 to 35, and n is a whole number from 1 to 2 inclusive with the proviso that when n is 2, R' has no more than 4 carbon atoms.

2. The ester of the formula

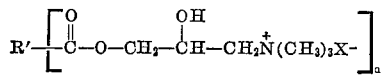

wherein R' is alkylene having from 2 to 5 carbon atoms, X is halogen having an atomic number from 17 to 35, and n is a whole number from 1 to 2 inclusive with the proviso that when n is 2, R' has no more than 4 carbon atoms.

3. The ester of claim 2 wherein X is chlorine.

4. 2-hydroxy - 3 - alkenoyloxypropyltrialkylammonium halide wherein said alkenoyl moiety has from 3 to 6 carbon atoms and from 1 to 2 ethylenic linkages, each of said alkyls has from 1 to 4 carbon atoms and said halogen has an atomic number of from 17 to 35.

5. 2 - hydroxy - 3 - alkenoyloxypropyltrimethylammonium chloride wherein said alkenoyl moiety has from 3 to 6 carbon atoms and from 1 to 2 ethylenic linkages.

6. 2 - hydroxy - 3 - methacrylyloxypropyltrimethylammonium chloride.

7. 2-hydroxy - 3 - acrylyloxypropyltrimethylammonium chloride.

References Cited

UNITED STATES PATENTS

| 2,484,487 | 10/1949 | Caldwell | 260—486 |
| 2,630,427 | 3/1953 | Hwa | 260—486 X |
| 2,824,861 | 2/1959 | Conbere et al. | 260—486 X |
| 3,008,851 | 11/1961 | Zeitachel et al. | 260—553 X |
| 3,059,024 | 10/1962 | Goldberg et al. | 260—486 |
| 3,075,999 | 1/1963 | June | 260—348.6 |
| 3,272,712 | 9/1966 | Kalopissis et al. | 260—404 X |

LORRAINE A. WEINBERGER, *Primary Examiner.*

RICHARD K. JACKSON, *Examiner.*

ALBERT P. HALLUIN, *Assistant Examiner.*